United States Patent [19]

Greene

[11] Patent Number: 5,747,167
[45] Date of Patent: May 5, 1998

[54] PROCESS FOR MAKING MOLDED POLYURETHANE LAMINATE ARTICLES

[76] Inventor: Steven R. Greene, 304 SW. 33nd Ave., Ocala, Fla. 34474

[21] Appl. No.: 725,099

[22] Filed: Oct. 2, 1996

[51] Int. Cl.⁶ .................................................. B32B 27/40
[52] U.S. Cl. .................................. 428/423.1; 264/171.1; 264/173.11; 264/241; 264/250; 264/255; 428/423.3; 428/425.1; 528/44
[58] Field of Search ........................... 428/423.3, 425.1, 428/423.1; 528/44; 264/171.1, 173.11, 241, 250, 255

[56] References Cited

U.S. PATENT DOCUMENTS

| | | |
|---|---|---|
| 3,941,633 | 3/1976 | Wang et al. |
| 4,077,821 | 3/1978 | Doerfling. |
| 4,150,850 | 4/1979 | Doerfling. |
| 5,051,310 | 9/1991 | Horn et al. ............... 428/423.3 |
| 5,215,796 | 6/1993 | Mueller et al. ........... 264/46.4 |
| 5,288,549 | 2/1994 | Zeitler et al. ............ 264/46.4 |
| 5,395,681 | 3/1995 | Hargarter et al. ....... 428/423.3 |
| 5,494,942 | 2/1996 | Ottens et al. . |

*Primary Examiner*—John M. Cooney, Jr.
*Attorney, Agent, or Firm*—Saliwanchik, Lloyd & Saliwanchik

[57] ABSTRACT

The subject invention pertains to unique methods for producing strong, multiple-layer polyurethane articles at low cost. The methods of the subject invention permit the production of highly detailed painted articles having multiple layers of polyurethane which resist separation. The subject invention further pertains to the articles produced by the methods of the subject invention.

9 Claims, 6 Drawing Sheets

5,747,167

PROCESS FOR MAKING MOLDED POLYURETHANE LAMINATE ARTICLES

BACKGROUND OF THE INVENTION

Polyurethanes are a class of polymers used extensively in the preparation of a large variety of products. Polyurethanes have a wide range of physical properties. The properties of a particular polyurethane will depend upon the exact chemical composition of the polyurethane polymer. Some polyurethanes are soft and spongy, while others are rigid.

In many instances, it is advantageous to prepare articles which have multiple polyurethane layers. Although such polyurethane laminates are useful for many articles, a frequent problem with such products involves the separation of the polyurethane layers. Such separation is particularly common when the product is subjected to high temperatures, changes in temperature, or if the product is exposed to salt water or other harsh conditions. Because polyurethane articles are often used in the automotive and boating industries, separation of polyurethane articles presents an important limitation to the usefulness of these products.

Adhesives and the like have been used in the past to apply facing materials to polyurethane products. U.S. Pat. Nos. 3,941,622; 4,077,821; 4,150,850; and 5,494,942 describe various means for securing polyurethane to adjacent materials. The prior art does not provide an easy, low-cost method for preparing molded polyurethane laminate articles.

Typically, large manufacturers, such as automobile companies, produce interior parts such as dash boards by either vacuum forming or injection molding. Up until now, the tooling costs and the molding process have made it economically unfeasible for the small to medium size manufacturer to use these processes. The amortization of the tool cost, which can run as high as $100,000 or more, raises the end cost of the product out of reach of both the marine and small transportation manufacturers. Increased labor costs and a need to achieve higher tolerances on parts, along with the ability to mass produce and deliver automotive quality parts, has led the medium size manufacturer to seek alternatives.

Currently, the marine and transportation industry typically employ in-house upholstery or outside vendors to make internal parts that act as cushioning or covering for their interiors. This is a very time-consuming and costly process that entails wrapping either a vinyl or leather sheet foam over a wood or plastic base. The material is either glued, stapled, or sewn onto the backing. With time, the wood either dry rots or the vinyl tears and opens the interior to water absorption. This causes the part to require either repair or replacement.

There exists a clear need for a process which can reliably and inexpensively produce molded laminated polyurethane objects. A procedure which could cost-effectively produce high quality molded polyurethane laminates is particularly needed.

BRIEF SUMMARY OF THE INVENTION

The practice of the subject invention pertains to the production of low cost but high quality molded polyurethane articles useful in a wide range of applications. The articles produced according to the unique methods of the subject invention are useful in applications ranging from automotive and boating products to seating products to industrial and household products.

The articles produced according to the subject invention comprise multiple layers of polyurethane which form a laminate molded material. The methods of the subject invention are particularly advantageous because the multiple layers of polyurethane self adhere in a highly secure manner, thus forming an interface of the polyurethane layers which resists separation. Advantageously, the subject process can be used to mold painted objects as well as objects having extensive topographic detail.

In a preferred embodiment of the subject invention, polyurethane layers are molded so as to be in direct physical and chemical contact with adjacent polyurethane layer(s). In an alternative embodiment, a cellulose layer such as, for example, paper can be placed between polyurethane layers to increase the strength and efficiency of the adhesion between the layers.

Typically, an initial step of the method of the subject invention involves the production of a mold, in which a polyurethane article can then be formed. The mold can be made using standard procedures, known to those skilled in the art, in conjunction with the teachings provided herein. In a preferred embodiment, the mold will have two or more lids, as described herein, which enable the production of the multiple adhering polyurethane layers.

The critical aspects of the subject invention involve specific procedures for forming a multilayer polyurethane article. As stated above, an initial step involves the production of a suitable mold. The mold is typically silicone and is made using standard procedures known to those skilled in the art combined with the teachings provided herein. For example, a master part (or article) can first be made from some suitable material such as fiberglass. The master part can then be placed into a frame into which liquid silicone is poured. The frame may be, for example, wood. Once the silicone hardens around the master part, the master part can be removed, thus leaving the silicone mold into which polyurethane layers can be introduced to make the polyurethane objects of the subject invention.

In a specific embodiment, a first polyurethane layer is deposited in the silicone mold and allowed to harden at an appropriate temperature. The thickness of this first layer is controlled by a first silicone lid which functions as the top of the mold. The silicone mold is then modified by, for example, using a second lid such that a second polyurethane layer can be applied to the top of the first layer, thus creating an interface between the two polyurethane layers. Additional polyurethane layers may also be added by pouring, injecting, or spraying.

In a preferred embodiment, the first polyurethane layer is applied without any mold release or other coating on the polyurethane. In accordance with the subject invention, it has been determined that the polyurethane layers adhere in an advantageous secure manner if no coating is applied to facilitate removal of the first lid.

A further aspect of the subject invention pertains to the production of molded polyurethane articles with painted surfaces. The painting of these surfaces can be efficiently accomplished by applying a paint layer to the silicone mold, prior to, the pouring of the first polyurethane layer.

The method of the subject invention makes it possible, for the first time, to provide high quality, low cost interior and exterior parts for the marine, transportation, and other industries. The quality of the subject products exceeds current manufacturing standards while offering many cost saving benefits.

In a specific embodiment, the process of the subject invention allows a molded "soft touch" integral skin foam outer surface to be laminated to a hard molded castable elastomer backing. This process enables the customized use of color, texture, and hardness of the outer skin. The backing is a liquid plastic that, when cured, has flexibility built into it to match the desired application. Also, mechanical fasteners can be embedded into the backing during the curing phase that allow for ease of attachment to other surfaces, thus eliminating any drilling on the production line.

An important aspect of the subject invention is the ability to use soft tooling as opposed to conventional hard or steel tools that are very costly and require months to produce. This is done with, for example, a silicone mold that reproduces even the smallest detail on any master part at a fraction of the cost in a short period of time.

The subject process allows for an unlimited amount of exact replicas of the master part to be produced at a fraction of the labor cost of the master.

DETAILED DISCLOSURE OF THE INVENTION

Figure 1A:
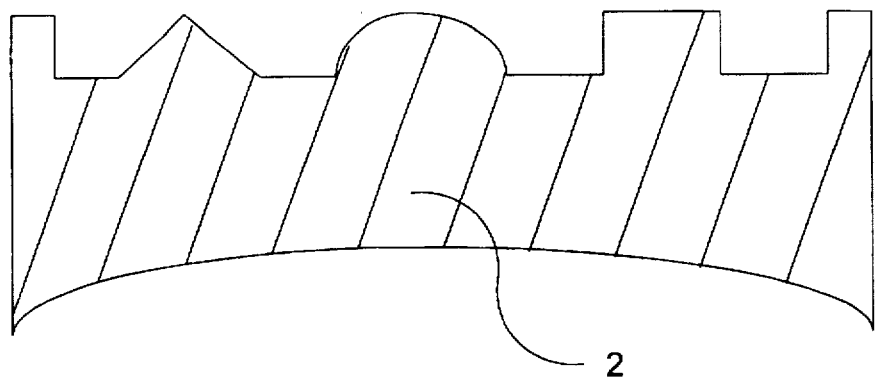
FIGS. 1A and 1B show the master article and the container used to produce the mold.

The subject invention pertains to unique and advantageous methods for preparing multilayer polyurethane articles. The polyurethane laminate objects produced by the subject process are also aspects of this invention. In a specific embodiment, the subject invention provides methods for making articles which have precisely controlled characteristics, including shape, hardness, and color. Typically, the multiple polyurethane layers have different physical characteristics such as, for example, different hardnesses.

In one specific embodiment, the procedures of the subject invention can be used to produce an article comprising multiple layers of polyurethane wherein one layer is a soft polyurethane integral skin which is attached to a layer of rigid polyurethane structural material. The procedures of the subject invention are particularly advantageous because the multiple polyurethane layers are securely laminated, without the need for adhesives, to produce a laminate product which maintains its integrity and has no layer separation.

The methods of the subject invention are also advantageous because these methods make it possible to make high quality, multiple layer molded polyurethane articles quickly and easily without great expense.

In a specific embodiment of the subject invention, an article can be made which comprises a soft, textured, rugged outer polyurethane layer, referred to herein as an integral skin, and a second polyurethane layer which typically makes up the structural component of the article. In this embodiment, a master part is first prepared from an appropriate material such as fiberglass. The master part has all of the features and surface topography which is desired of the ultimate finished product. The method of the subject invention is highly advantageous because the products which can be mass-produced by this process possess all of the features of the master part. The high fidelity of this process is particularly unexpected in view of the low overall cost of the mold and the process which produces the finished article.

Once the master part is prepared, a mold is formed. In a preferred embodiment, the mold is made of silicone. Silicones for use in making such molds are well known and readily available. Typically, a two-component mold-making silicone will be used.

In one embodiment, the silicone mold can be made to surround the entire master article. Thus, to remove the article, the mold must be cut and a portion removed to facilitate removal of the master article. The portion of the mold which is removed is referred to herein as a lid.

In a preferred embodiment of the subject invention, the lids are prepared in steps which are separate from the production of the rest of the mold. For example, in a first step, the master part can be placed in an appropriate container, such as a wooden box, into which liquid silicone can be added to surround all but the top portion of the master part. The master part can then be removed. Next, a first silicone lid can be prepared for use when the first layer of polyurethane is injected into the mold. This lid must leave a void of only the volume which is desired to be occupied by the first polyurethane layer.

In order to most efficiently practice the method of the subject invention, a separate lid is needed for each polyurethane layer of the article which is to be produced. Thus, in the specific embodiment wherein an integral skin will cover a structural layer, a specific lid is prepared which will leave a space having only the desired thickness of the integral skin. Thus, different lids will be used at different steps in the process. A first lid effectively occupies the volume of the mold that will ultimately be filled with the structural polyurethane layer. This first lid leaves an open space in the mold which is only the volume that will be occupied by the integral skin. The integral skin is formed by injecting polyurethane into the void space formed between the mold and the first lid. Once the first polyurethane layer has solidified, the first lid is removed and is replaced by the second lid. The second lid corresponds to the outside dimensions of the master part. Thus, when the second lid is applied, there is a new void space, above the first polyurethane layer, which corresponds to the volume which is to be occupied by the structural polyurethane layer. At this point, the second polyurethane layer is formed by injecting an appropriate polyurethane material into this second void space.

Once the second polyurethane layer has solidified, the second lid can be removed. At this point, the fully finished object can be removed from the mold.

In a preferred embodiment, a mold release compound such as FREKOTE 1711 I, obtainable from Dexter Corporation, Dexter Drive, Brook, N.H. 03874, is applied to the internal surface of the mold prior to the formation of the first polyurethane layer. A further aspect of a preferred embodiment of the subject invention is the absence of any mold release compound applied to the first lid. It has been found that, surprisingly, the first lid can readily be removed without the need for a mold release compound. Thus, the second polyurethane layer can then be applied directly to the surface of the first polyurethane layer without the presence of any residual mold release compound.

A variety of polyurethanes can be used in the practice of the subject invention. As would be appreciated by those skilled in the art, polyurethanes can be purchased as two-component systems. Upon mixing of the two components, a chemical reaction is initiated whereby the product having the desired physical characteristics is formed. The physical characteristics of the polyurethane product are, of course, dictated by the specific chemical composition. The components of polyurethanes are typically called the "A" component and the "B" component. The "A" component is typically an isocyanate, while the "B" component is typically a polyol. These components are readily available with instructions for use from suppliers such as Universal Polymers Corporation, 1122 W. Carrier Parkway, Grand Prairie, Tex. 75050; and Urethane Technologies, 40 Enterprise Boulevard, Atlanta, Ga. 30336.

A wide variety of modifications can be made to the process of the subject invention without departing from the spirit of the general process described here. For example, a paint can be applied to the internal surface of the mold prior to the injection of the first polyurethane layer. In a preferred embodiment, the paint will be an acrylic or other water-based paint.

An additional optional variation is the insertion of fastening devices into the article. Typically, these fastening devices will be embedded in the structural layer of the article. The fastening devices may be any such appropriate device known to those skilled in the art and would include, for example, steel bolts and/or plastic fasteners.

A further modification involves the insertion of a cellulose layer between the layers of polyurethane. The cellulose layer may be, for example, paper. The addition of the cellulose layer adds even greater strength to the interface between polyurethane layers by further reducing the possibility of separation of the layers.

In addition to the process described herein, the subject invention concerns products produced by this unique process. These products have multiple layers of polyurethane wherein these layers are strongly adhered directly to each other with no adhesive used between the layers. The strength of the connection between the layers is enhanced by the absence of any mold release compound. In one embodiment, the polyurethane layers are separated by a cellulose layer.

Following is an example which illustrates procedures for practicing the invention. This example should not be construed as limiting. All percentages are by weight and all solvent mixture proportions are by volume unless otherwise noted.

EXAMPLE 1—Production of Multilayer Polyurethane Article

A specific embodiment of the method of the subject invention is shown in the Figures. These Figures show a cross-section of the items used and made according to the subject invention.

Figure 1B:
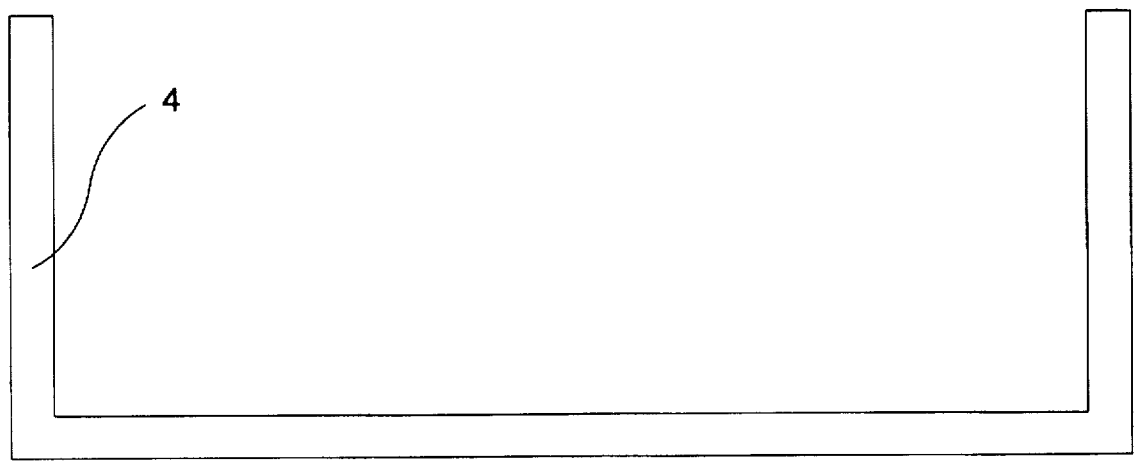
Figure 2A:
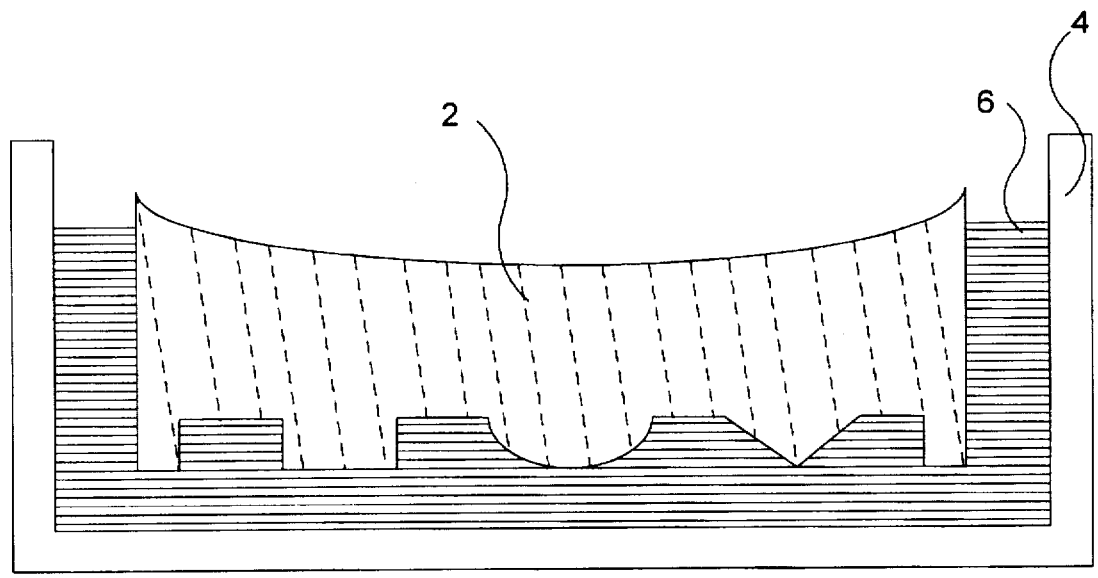
FIGS. 2A and 2B show the production of the mold.
Figure 2B:
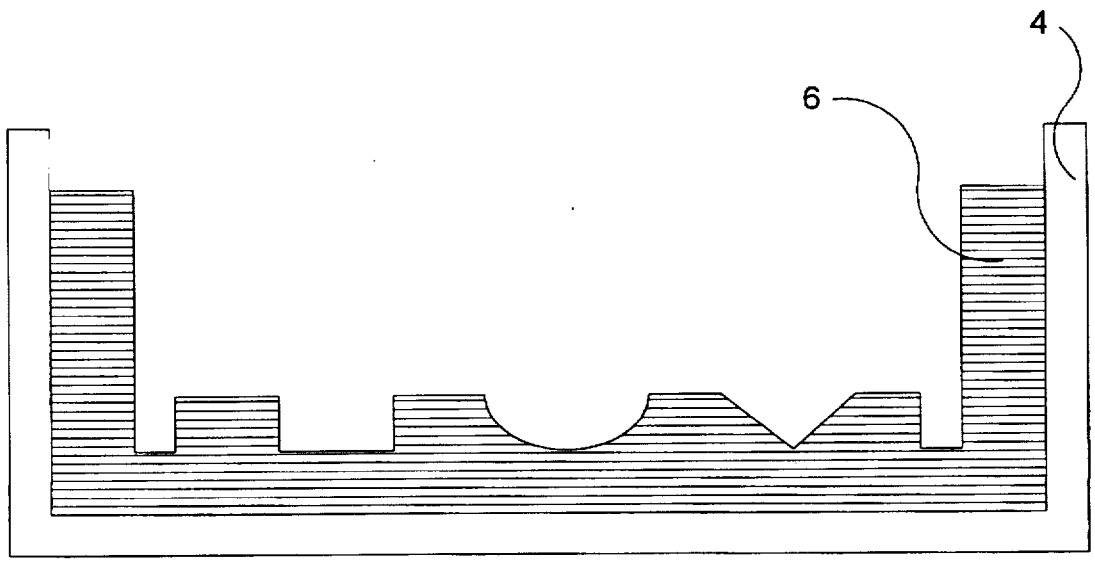

First, a master part 2 is prepared having the exact shape, size, and surface topography of the desired article. FIG. 1A shows a cross-section of the master part 2. The master part 2 is then placed into a box 4 with its top portion facing down. The box is shown as FIG. 1B. The master part may be, for example, attached to the top of the box so that a space exists between the bottom of the box 4 and the lowest portion of the master part 2. Similarly, space is left between the sides of the master part 2 and the box 4. Into this space is poured liquid silicone 6. The liquid silicone comes partway up the side of the master part as shown in FIG. 2A. The master part 2 is then removed, thus leaving the hardened silicone mold 6 as shown in FIG. 2B.

Figure 3A:
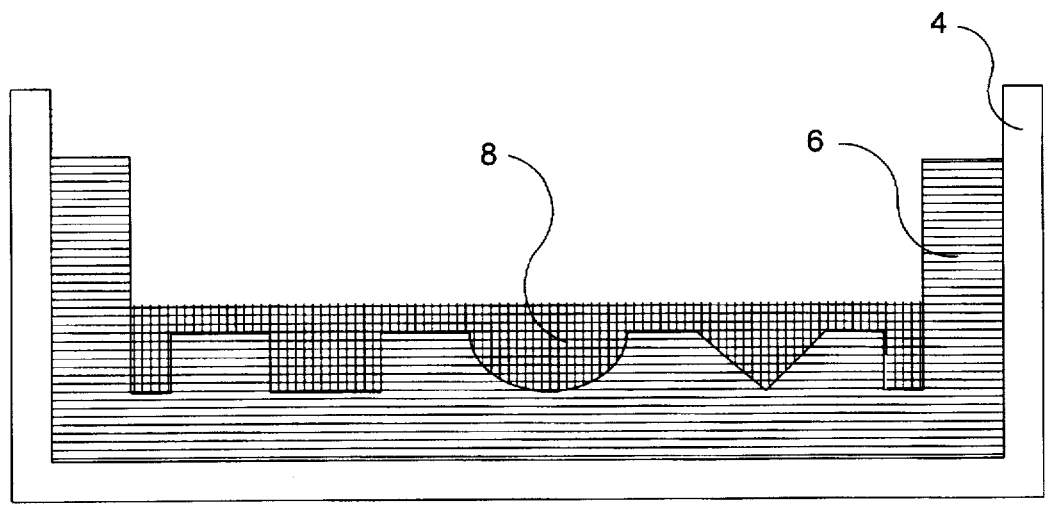
FIGS. 3A and 3B show the production of a final lid for the mold.
Figure 3B:
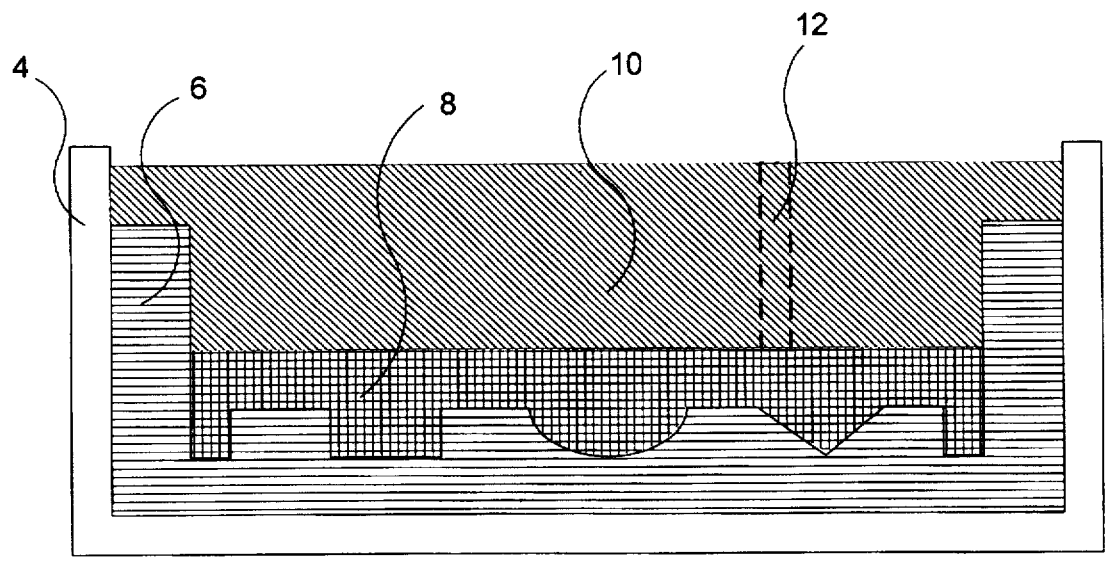

In this specific embodiment of the subject invention, the lids are made by adding clay 8 to the mold 6 so as to occupy the volume which will be occupied by discrete layers of polyurethane. See FIG. 3A. Thus, for an article having two polyurethane layers—an integral skin and a structural layer—a first lid 10 can be made by initially adding clay 8 to occupy the volume which will ultimately be occupied by the integral skin polyurethane layer. Once the clay is in place, liquid silicone is added, thus forming a first lid 10 which will cover the first polyurethane layer. Each lid (10, 16) is formed with a port (12, 18) through which the polyurethane can be injected into the mold. The formation of lids is shown in FIGS. 3A and 3B.

Figure 4A:
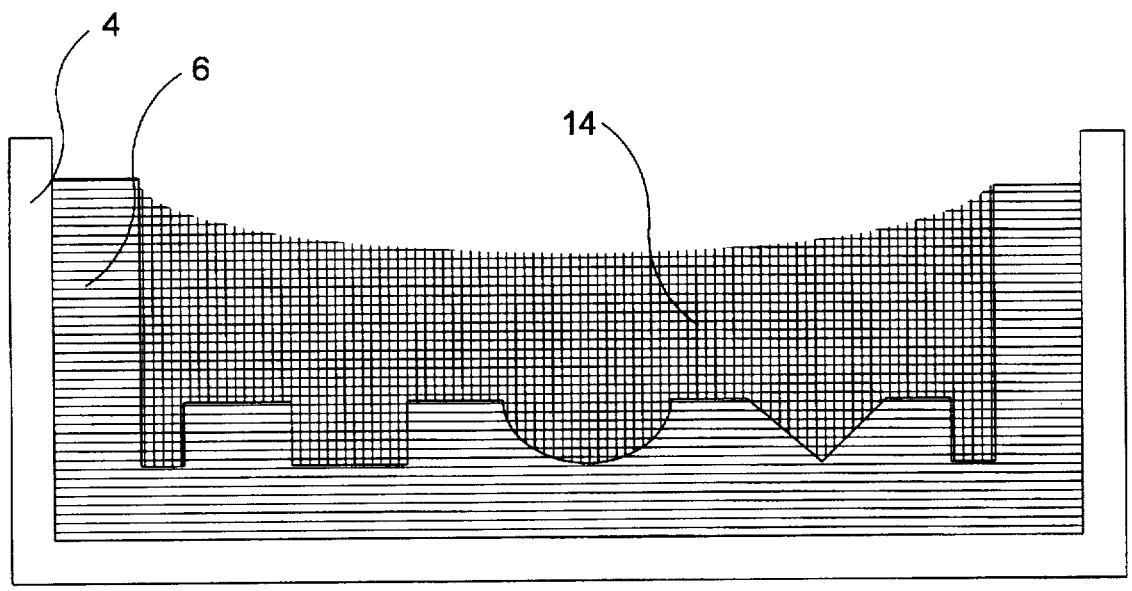
FIGS. 4A and 4B show the production of a second lid for the mold.
Figure 4B:
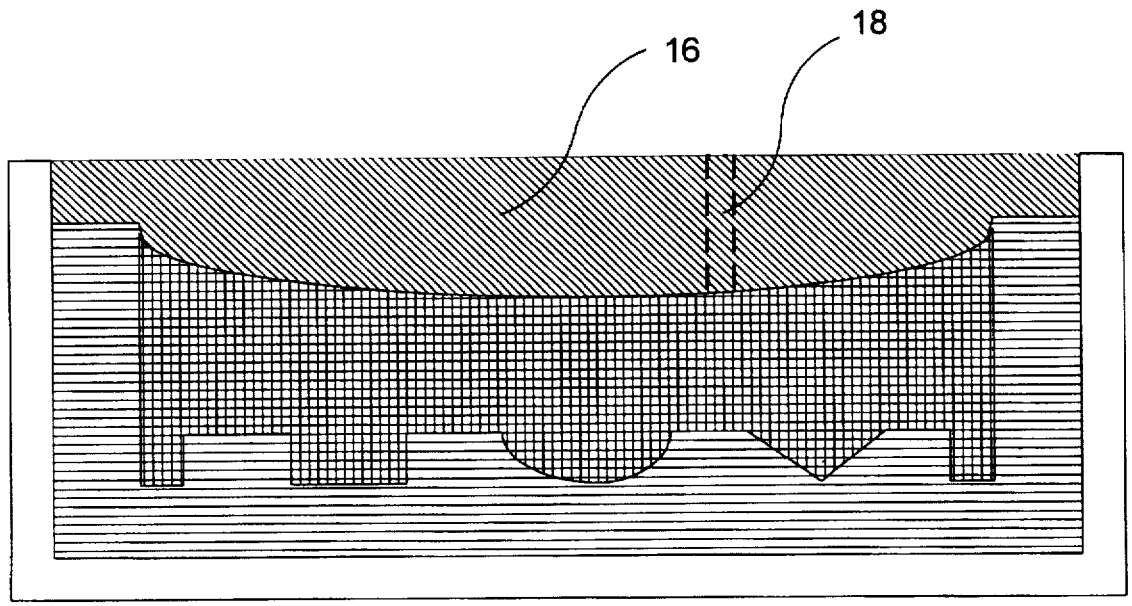

After the first lid 10 has been formed, it can then be removed and saved for subsequent use. The lid for the second polyurethane layer can then be formed by adding additional clay 14 corresponding to the volume to be occupied by the second polyurethane layer. See FIGS. 4A and 4B.

The clay which is used according to the subject invention should be a fine-grain clay which does not react with the mold material. Thus, in the typical case where the mold is made from silicone, the clay should not react with silicone. In a specific embodiment, a mineral-based "clean" clay is used.

Figure 5A:
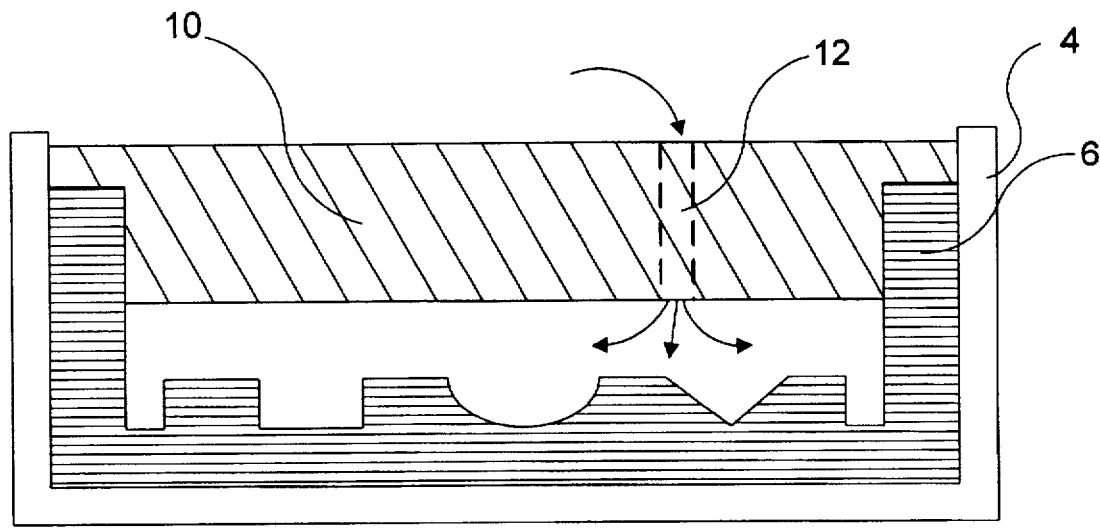
FIGS. 5A and 5B show the production of a first polyurethane layer.
Figure 5B:
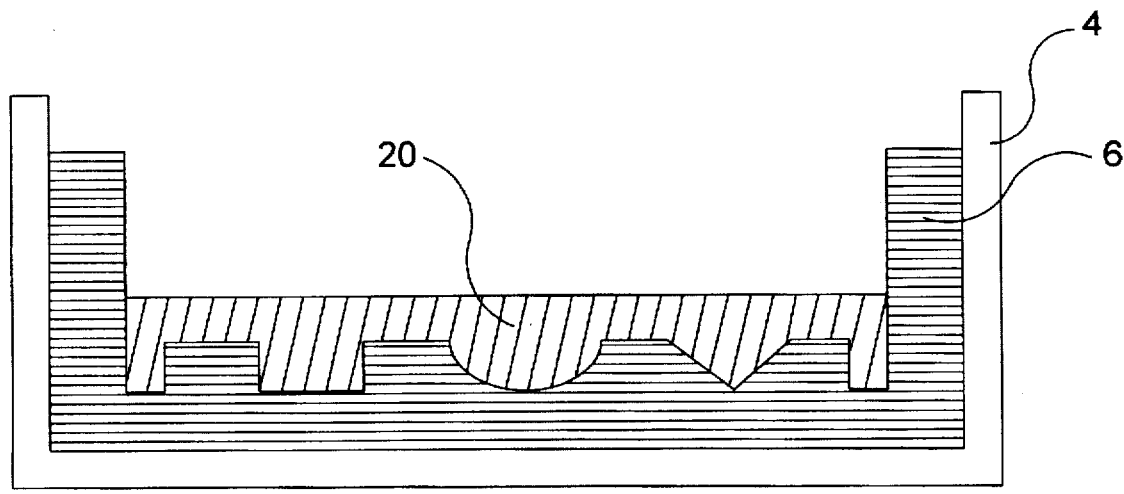
Figure 6A:
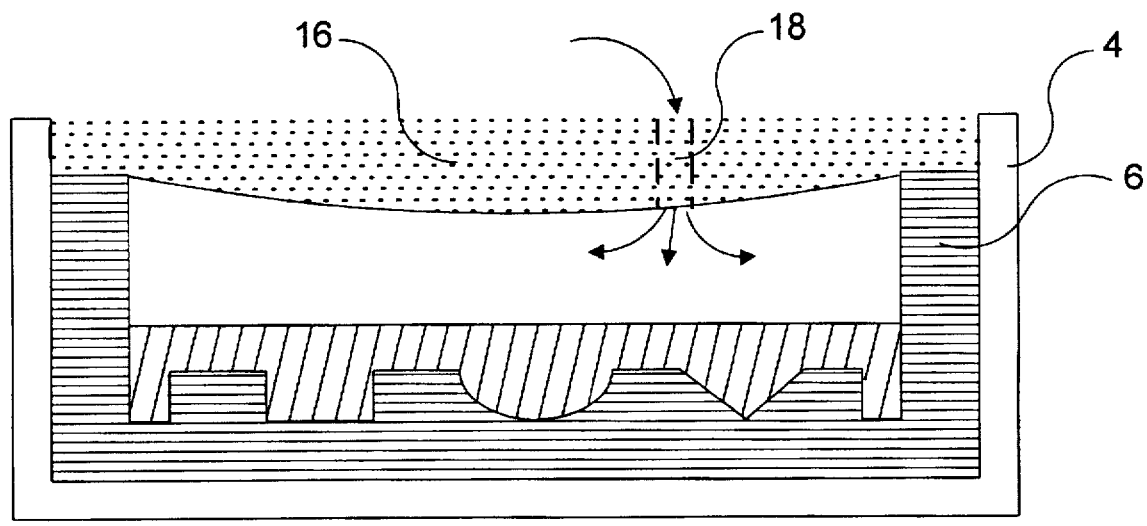
FIGS. 6A and 6B show the production of a second polyurethane layer.
Figure 6B:
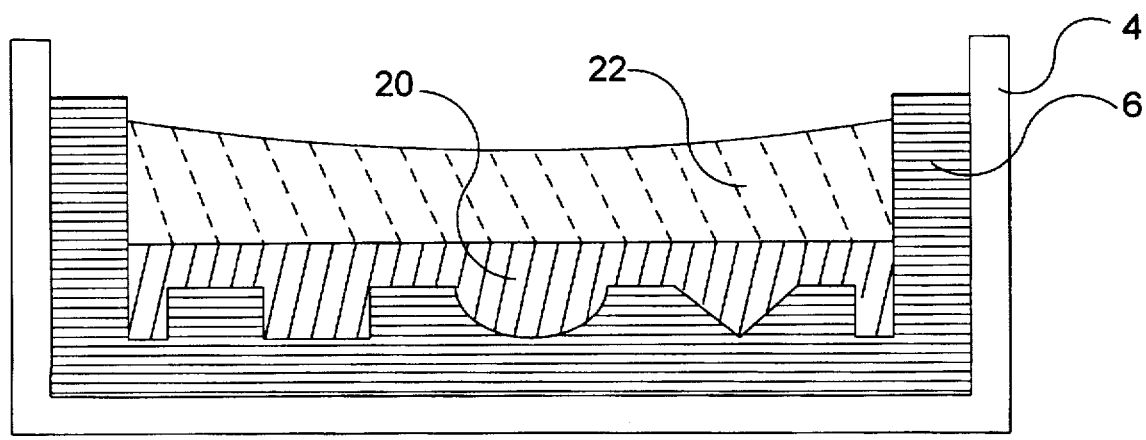

The articles are then prepared by placing the first lid 10 onto the silicone mold 6 and injecting a first polyurethane material through the port 12 into the void space. This is shown in FIGS. 5A and 5B. In a preferred embodiment, the mold 6 or lids (10, 16) may have slits or small holes to facilitate the release of pressure. Once the first polyurethane layer 20 hardens, the first lid 10 is removed and is replaced by the second lid 16, and the second polyurethane layer is injected through the injection port 18. This is shown in FIGS. 6A and 6B. Once the second polyurethane layer has hardened 22, the second lid 16 can be removed and the finished article (20 and 22) removed from the mold.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. A method for producing a molded article comprising multiple adjacent layers of polyurethane wherein said method comprises preparing a mold for a master part wherein said master part has the size, shape, and surface topography of the molded article, and wherein said mold has multiple lids, each of which corresponds to one of said polyurethane layers, and wherein said method further comprises:

(a) forming a first polyurethane layer, the size and dimensions of which are determined by a first lid;

(b) removing said first lid;

(c) forming a second polyurethane layer adjacent to said first layer, wherein the size and dimensions of said second layer are determined by a second lid; and (d) removing said molded article from said mold.

2. The method, according to claim 1, wherein said mold is made from silicone.

3. The method, according to claim 1, wherein a mold release compound is applied to the mold but not to said first lid.

4. The method, according to claim 1, wherein paid is applied to the mold before the addition of the first polyurethane layer.

5. The method, according to claim 1, wherein said lids are formed by adding clay to said mold in order to define the voids which will be occupied by the polyurethane layer.

6. The method, according to claim 1, wherein said lids have injection ports.

7. The method, according to claim 1, wherein a cellulose layer is applied between layers of polyurethane.

8. The method, according to claim 1, wherein a fastener is embedded in one of said layers of polyurethane.

9. The method, according to claim 1, wherein said first polyurethane layer is a soft polyurethane and said second polyurethane layer is a rigid polyurethane.

* * * * *